(12) United States Patent
Straub et al.

(10) Patent No.: US 8,544,819 B2
(45) Date of Patent: Oct. 1, 2013

(54) DISTRIBUTION VALVE WITH INTEGRATED FLOW METERING UNIT

(75) Inventors: Hans Straub, Bad Überkingen (DE); Martin Jäger, Geislingen (DE)

(73) Assignee: Straub OHG, Bad Überkingen (DE)

( * ) Notice: Subject to any disclaimer, the term of this patent is extended or adjusted under 35 U.S.C. 154(b) by 233 days.

(21) Appl. No.: 12/735,715

(22) PCT Filed: Feb. 13, 2009

(86) PCT No.: PCT/EP2009/001035
§ 371 (c)(1),
(2), (4) Date: Aug. 11, 2010

(87) PCT Pub. No.: WO2009/100930
PCT Pub. Date: Aug. 20, 2009

(65) Prior Publication Data
US 2010/0307611 A1    Dec. 9, 2010

(30) Foreign Application Priority Data
Feb. 13, 2008    (DE) .......................... 10 2008 010 347

(51) Int. Cl.
*F16K 37/00* (2006.01)
*F16K 35/00* (2006.01)

(52) U.S. Cl.
USPC .......................... 251/285; 137/551; 137/625.3

(58) Field of Classification Search
USPC ............... 251/92, 93, 95, 100, 104, 118, 120, 251/121, 122, 284, 285, 287, 288; 267/175, 267/177; 137/553, 556, 614.2
See application file for complete search history.

(56) References Cited

U.S. PATENT DOCUMENTS

| | | | | |
|---|---|---|---|---|
| 406,029 | A * | 7/1889 | Curtis | 137/489.3 |
| 1,833,193 | A * | 11/1931 | Wray | 251/120 |
| 3,699,998 | A * | 10/1972 | Baranowski, Jr. | 137/327 |
| 4,064,908 | A * | 12/1977 | Loe | 137/614.17 |
| 4,424,952 | A * | 1/1984 | Thomson et al. | 251/54 |
| 4,696,320 | A * | 9/1987 | Bull | 137/116.5 |
| 5,004,011 | A * | 4/1991 | Linder et al. | 137/556 |
| 5,741,003 | A * | 4/1998 | Segien, Jr. | 251/95 |
| 5,890,515 | A * | 4/1999 | Spiess et al. | 137/552 |
| 6,119,724 | A * | 9/2000 | Cazzaniga | 137/552 |
| 6,205,827 | B1 * | 3/2001 | Lane | 70/180 |
| 6,325,098 | B1 * | 12/2001 | Motta et al. | 137/551 |
| 6,691,737 | B2 | 2/2004 | Muller et al. | |

(Continued)

FOREIGN PATENT DOCUMENTS

| | | |
|---|---|---|
| DE | 10006326 | 8/2001 |
| EP | 1734346 | 12/2006 |

*Primary Examiner* — John K Fristoe, Jr.
*Assistant Examiner* — Seth W Mackay-Smith
(74) *Attorney, Agent, or Firm* — Horst M. Kasper

(57) ABSTRACT

The invention relates to a distribution valve with integrated flow metering unit, in particular for warm water heating systems, for use in a pipe, wherein a closable valve seat in the distribution valve and an axially movable sealing part thereto are provided, wherein one section of the sealing part is held and guided in an attachment element which is arranged externally against an opening in the pipe and said section of the sealing part has a handle wherein a stroke limiter limiting the axial displacement of the sealing part is allocated to the sealing part and slash all to the controlling attachment element.

9 Claims, 9 Drawing Sheets

(56) References Cited

U.S. PATENT DOCUMENTS

Figure 1:
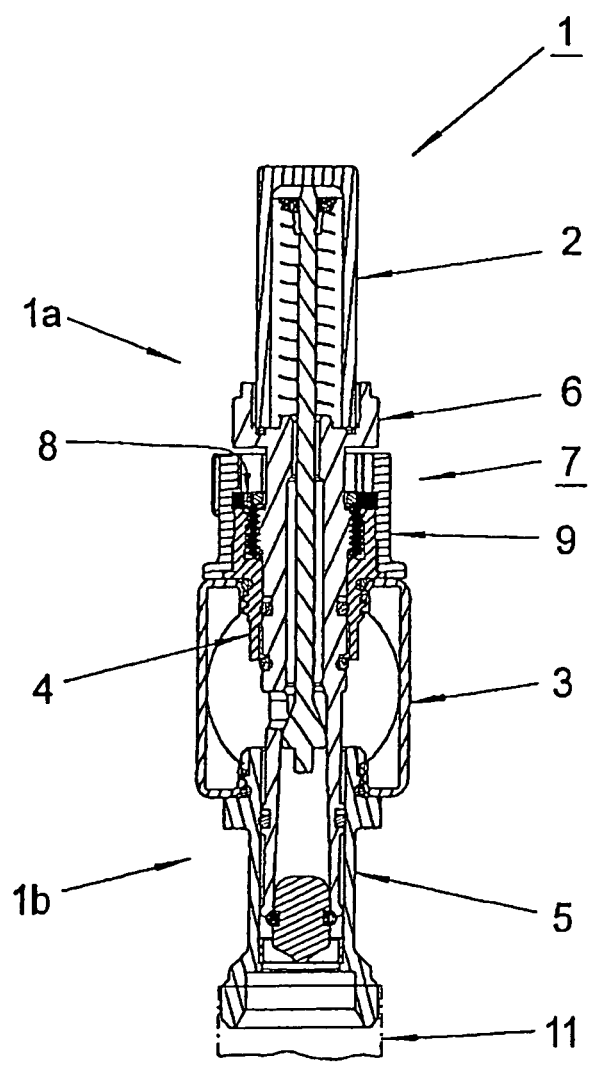

| | | | |
|---|---|---|---|
| 6,736,165 B2 * | 5/2004 | Bender | 137/883 |
| 6,994,109 B2 * | 2/2006 | Spiess | 137/552 |
| 7,121,299 B2 * | 10/2006 | Lumello | 137/552 |
| 2007/0062340 A1 * | 3/2007 | Li et al. | 81/63.1 |

* cited by examiner

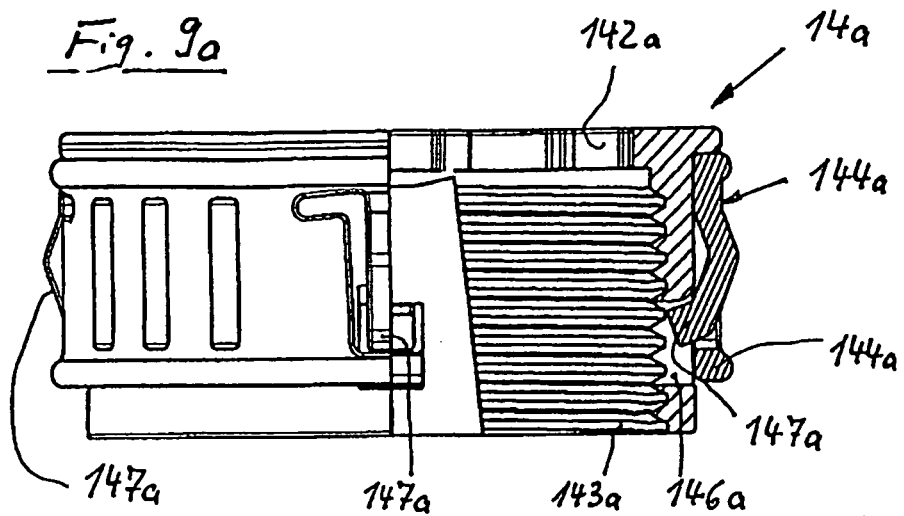
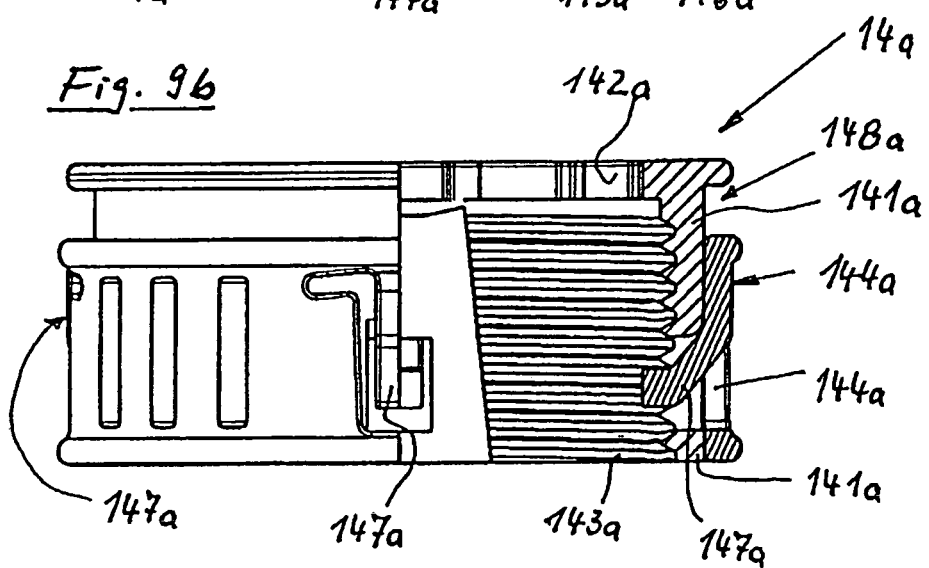
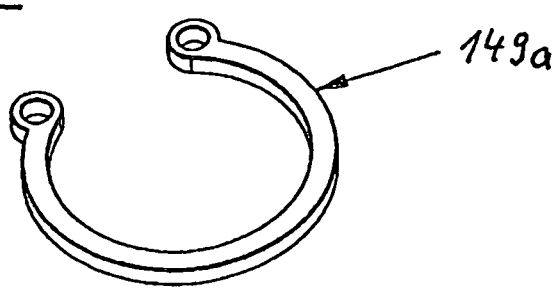

DISTRIBUTION VALVE WITH INTEGRATED FLOW METERING UNIT

The invention relates to a distribution valve with a flow through metering device in particular for warm water plants.

Distribution valves combined with a flow through metering device for warm water heating plants are known from the state-of-the-art for use in a main line and/or several connection lines branching off the main line. A closable valve seat is furnished in the distribution valve and a flow though metering device with a display is furnished. The display extends along an axis into the connection pipe of the distribution valve, wherein the connection pipe projects radial into the conduit pipe, comprises out of a stream part deflectable by the stream in the connection pipe, wherein the respective position of the stream part in the connection pipe serves for displaying a flow through volume of the medium through the connection pipe, which flow through volume can be read on the outside at the through flow metering device. An exit opening—the valve seat—furnished in the connection pipe is opened or closed for the setting of the flow through volume of the medium with a closure part by rotating at a set element. Such a distribution valve is known for example from the European patent document EP 1734346 A2.

These distribution valves serve for balancing the individual conduits relative to each other for preventing power losses, as well as for hydraulic balancing in the hot water heating plant.

It is disadvantageous in connection with these inventions that depending on the construction more or less finger tip touching and responsibility awareness of the operator during the setting are required for an accurate automatic control of the required flow through volume.

Starting from this state-of-the-art, the object of the invention comprises to improve a distribution valve of the kind with a through flow metering device such that a set position of the valve body with respect to a flow through volume is reproduceable multiple times and successively in time.

It is a core of the invention that the distribution valve with the through flow metering device is coordinated to a preset device, wherein the preset device limits the stroke of the valve body for opening of the distribution valve.

A particular preferred embodiment is seen where a stroke limiter is coordinated to the closure part and/or guiding attachment element as a preset device, wherein the stroke limiter limits the axial shifting of the closure part associated with the opening of the distribution valve.

An advantageous variation is in addition seen in that the stroke limiter coordinated to the closure part and/or to the leading attachment element of the distribution valve is formed of an axially movable setting member and a security element. The setting member is according to one embodiment an intermediate part, which intermediate part is disposed concentric to the axis of motion of the valve in between a section of the attachment element and a section of the closure part.

Preferably the intermediate part is a cylindric body, wherein the upper side of the cylindric body exhibits a collar and from its lower side is furnished a through running inner thread and an outer thread body-inwardly in axial direction, wherein a trepan is furnished from the upper side in the direction inner thread, and wherein a stop part is disposed in the trepan.

A further advantageous variation of a first embodiment is realized in that the securing element is a blocking member, wherein the blocking member with the cylindrical body is disposed axially shiftable and concentrically around the outside disposed section of the attachment element and wherein the blocking member is shape matchingly connected with the intermediate part of each of its possible axial positions.

Preferably, the cylindric body of the blocking member exhibits a through bore hole with longitudinal grooves from its upper front face in the direction of its lower front face, and a middle bore hole and a front bore hole, wherein the body region disposed near the lower front face is formed as a flange and wherein a hexagon shaped recess is provided starting at the lower front face.

According to a second embodiment variation it is provided that the axially movable setting member for limiting the stroke comprises a blocking cap and a stop sleeve coacting and that the security element is formed by a security ring, wherein the security ring is disengageably and lockably disposed at the outer jacket of the blocking cap in a circumferential channel.

Preferably it is provided that the blocking cap exhibits a sleeve part, on the one end has an inner collar, and the inner face of the sleeve part is formed as an inner thread.

The stop sleeve has an inner flange on the one end and has an outer flange on the other end. The inner face of the stop sleeve is furnished with longitudinal grooves. The outer flange of the stop sleeve engages at the inner collar of the blocking cap in an incorporated state while the valve body is completely opened. The inner flange of the stop sleeve is hinged at the end region of the valve body. If the valve body for opening the distribution valve is moved axially toward the outside then the stroke is limited upon stop impact of the outer flange at the inner collar of the blocking cap. The blocking cap is arrested against axial motion by the security ring upon performed setting of the stroke limitation of the blocking cap. For this purpose the security ring is rotated until the security ring locks into at least one of the longitudinal channels of the outer thread of the attachment element.

It is further according to the present invention provided that the security element for arresting the selected axial position of the blocking cap is integral with the blocking cap for lowering the production technological expenditure and for further improving the handling of the setting member for the stroke limitation upon a further structuring of the precedingly recited second embodiment variation. The above recited security ring is here replaced by locking or snap-in parts, wherein the locking parts are furnished at the outer jacket of the blocking cap. Here the outer jacket of the blocking cap itself is formed as an axial shiftable ring part. This ring part is disposed concentricly around the sleeve part of the blocking cap. Here the ring part is shorter than the sleeve part in its axial length. Preferably four spring elastic locking parts are furnished in the axially shiftable ring part, preferably arranged in a 90 degree subdivision. The same number of recesses is furnished in the sleeve part. A locking or snap-in part in each case protrudes through a recess into the inner chamber of the sleeve part. Two functioning positions can be set by axial shifting of the ring part guided at the sleeve part. Each locking part, as precedingly recited protrudes into the inner chamber of the sleeve part in the one position—the arresting position—, and each locking part is pressed radial outwardly at a wall section of the recess in the other position—the motion position—. Each locking part grips into one of the already further in front recited longitudinal channels of the attachment element. A blocking part is disposed in a radial slot formed between a front side of the ring part and the sleeve part for securing this arresting position.

The blocking part is removed, the ring part is shifted in axial direction such that the locking parts are led out of the longitudinal channels of the attachment element for changing of the said position of the stroke limiter. Then the blocking cap is brought into a new set position in axial direction by rotation. Then the ring part is axially moved in an opposite direction, whereby the spring elastic locking parts move again inwardly and finally in each case engage into a longitudinal channel of the attachment element. A rotation of the blocking cap with its inner thread at the thread ring of the attachment element is now not any longer possible. The blocking part is again disposed in the radial slot, whereby an unintended opening of the blocking mechanism cannot occur.

The mode of functioning of a first embodiment variation of the new distribution valve is presented in the following. Initially the arresting is to be disengaged from the blocking member, by pulling upward of the blocking member until the inner hexagon is free and the blocking member receives form matching closure at the same time with the upper region of the valve body. Now the valve body is shifted in axial direction outwardly by rotating of the blocking member, the valve seat is opened and the desired through flow is set. Synchronously with the shifting of the set member in axial direction, the valve body is also moved in the same direction without that the position/location of the valve body is changed relative to the upper region of the set member. In the following the blocking member is again pressed downward until its inner hexagon is shifted onto the outer hexagon. Now with respect to the desired flow through volume, the axially positioned set member is secured against shifting. Hereupon the valve body is moved from its opened position through the performing of the presetting into the closed position by actuation of the valve body by gripping of a grip element furnished at the upper region of the valve body. The valve body can only be moved to the pre-given maximum position, wherein the pre-given maximum position corresponds to the desired through flow volume in case of a following (re-) opening of the distribution valve by moving the valve body. A reproduceablility of the preset flow through volume is guaranteed by the performed presetting and the arresting position of the set member.

In the following the mode of functioning of the described second embodiment variation of the new distribution valve is presented.

The security element, this security ring, is disengaged from its arresting position. A part of the set member, the blocking cap is screwed upwardly. Then the valve body is turned at its hand wheel, until the requested through flow volume is regulated.

Then the blocking cap is turned against the stop sleeve belonging to the set member such that stop sleeve and the blocking cap jointly limit the maximum stroke required for a reproducible setting of the through flow volume.

Then the security ring held in the outer jacket of the blocking cap is again snapped in and the set member is secured against turning.

The distribution valve can be closed according to need. A reproducibility of the preset through flow volume during the opening of the distribution valve is guaranteed by the arrested position of the blocking cap.

The invention is explained in the following by way of preferred embodiment examples illustrated schematically in drawings.

Figure 2:
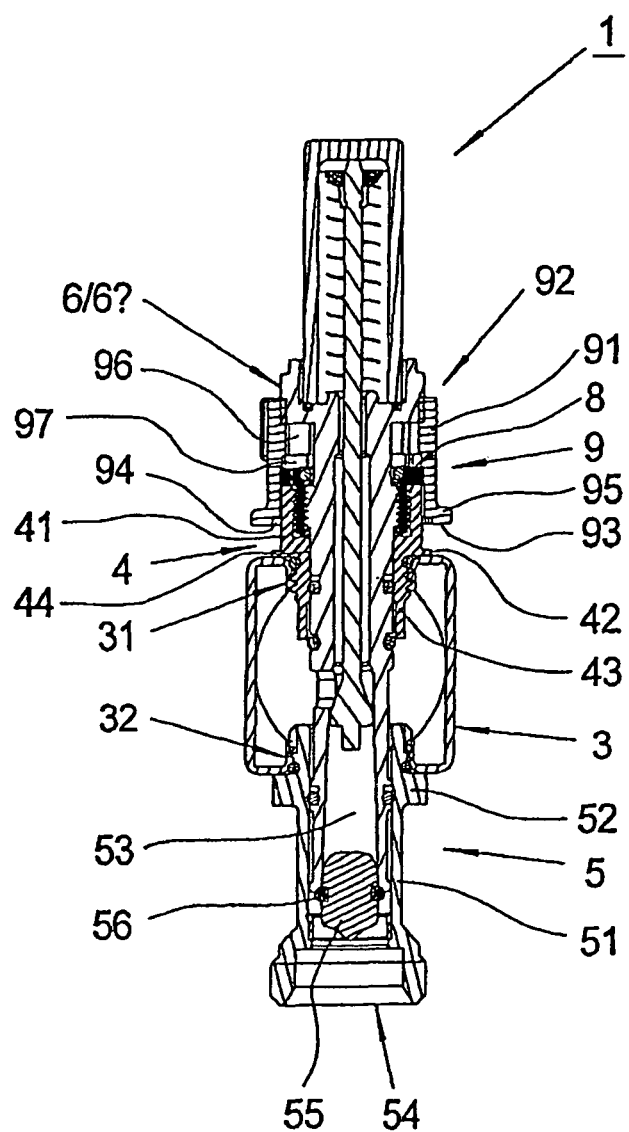
Figure 3:
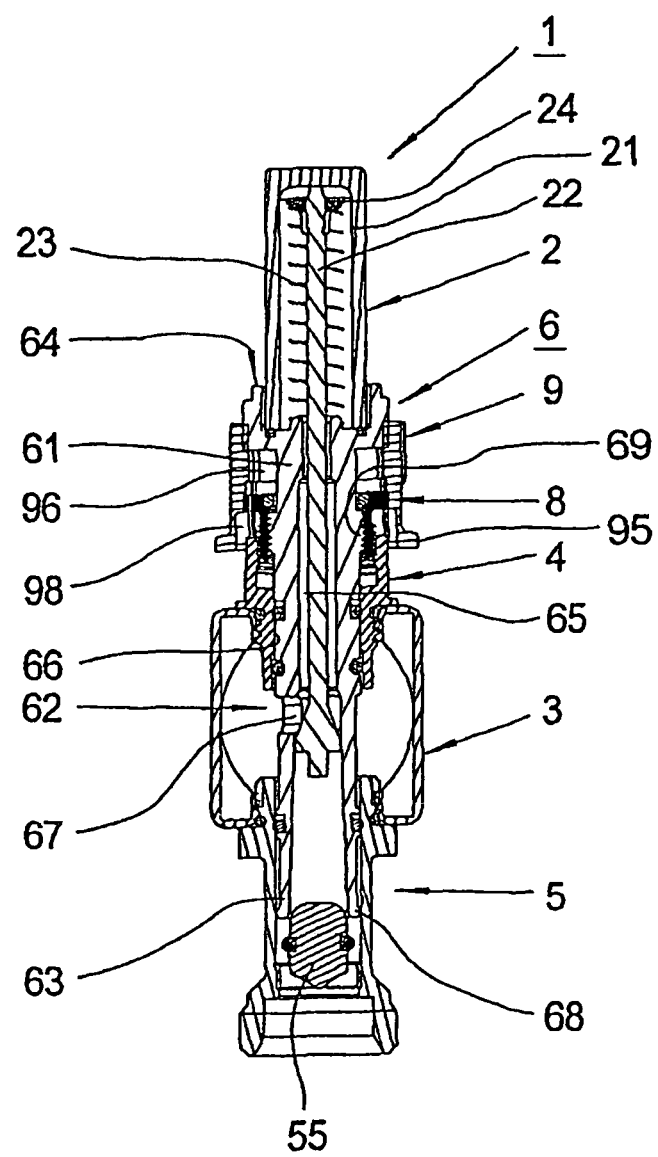
Figure 4:
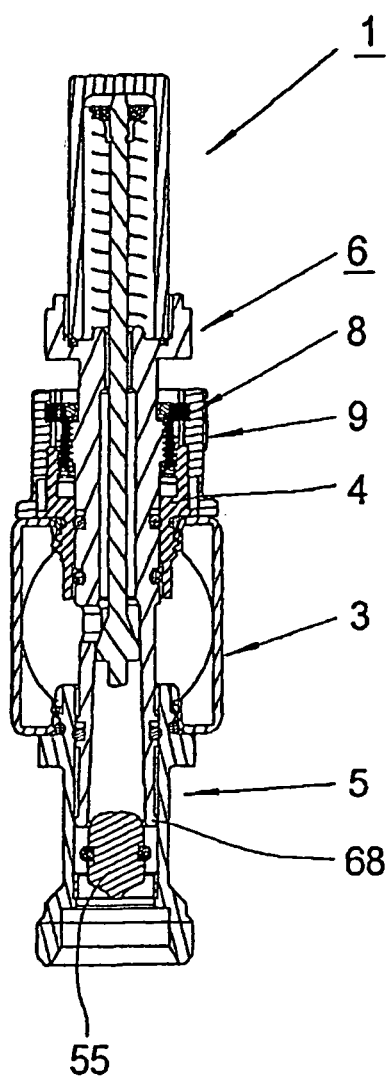
Figure 5:
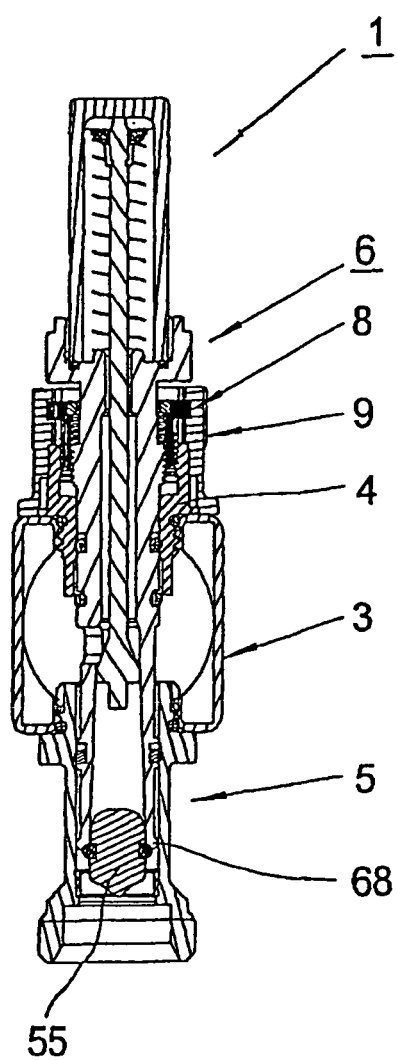
Figure 6A:
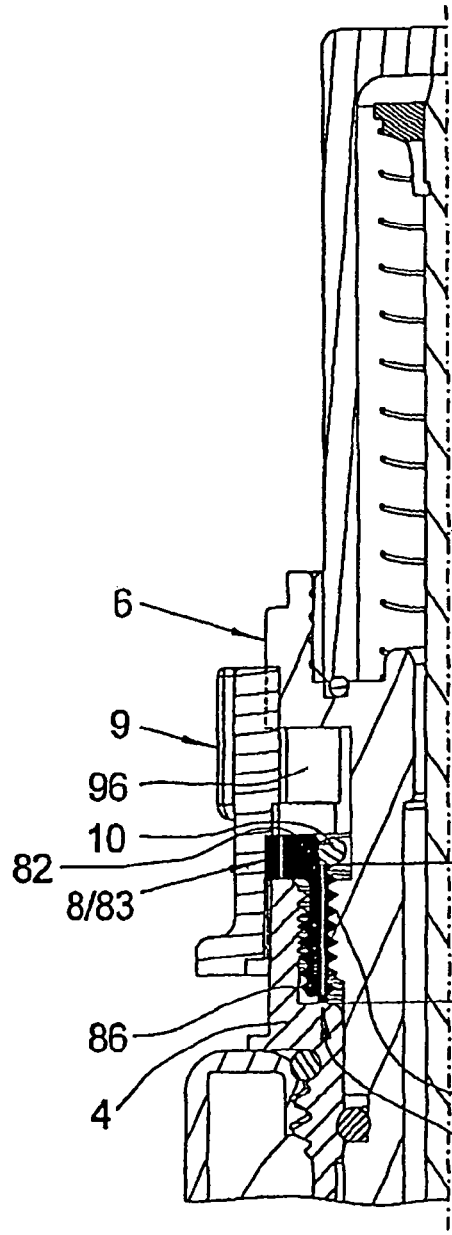
Figure 6B:
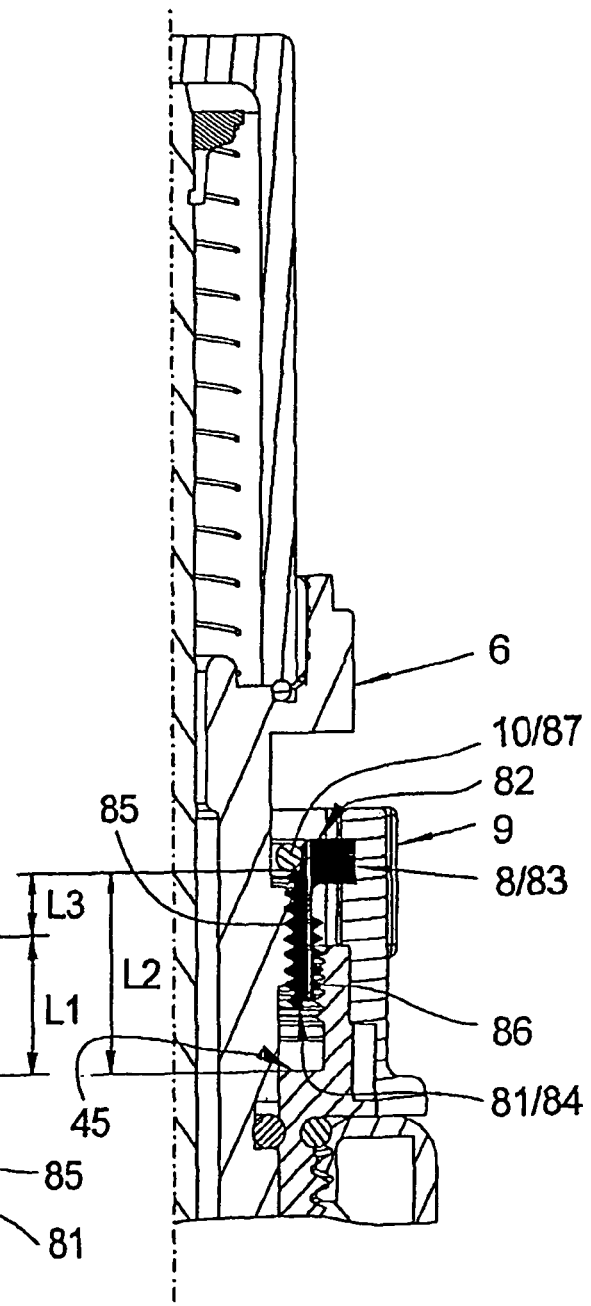
Figure 7:
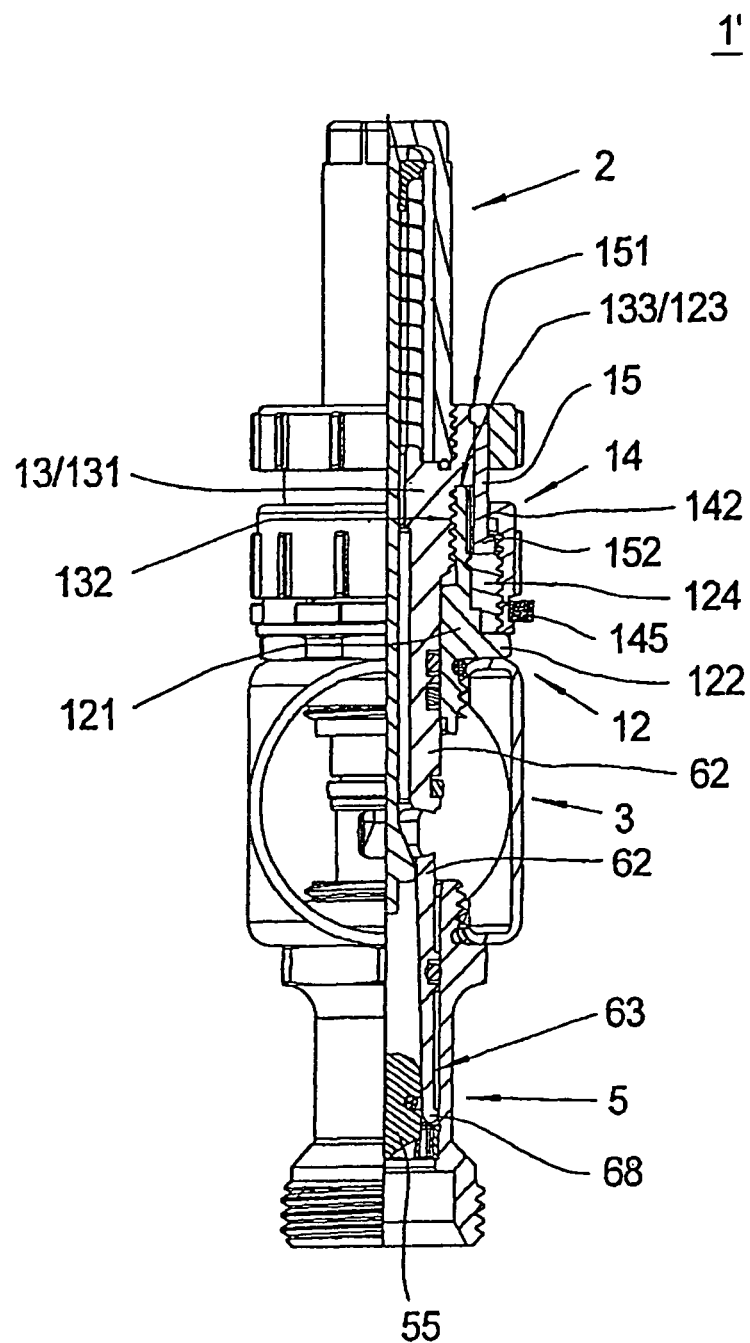
Figure 8:
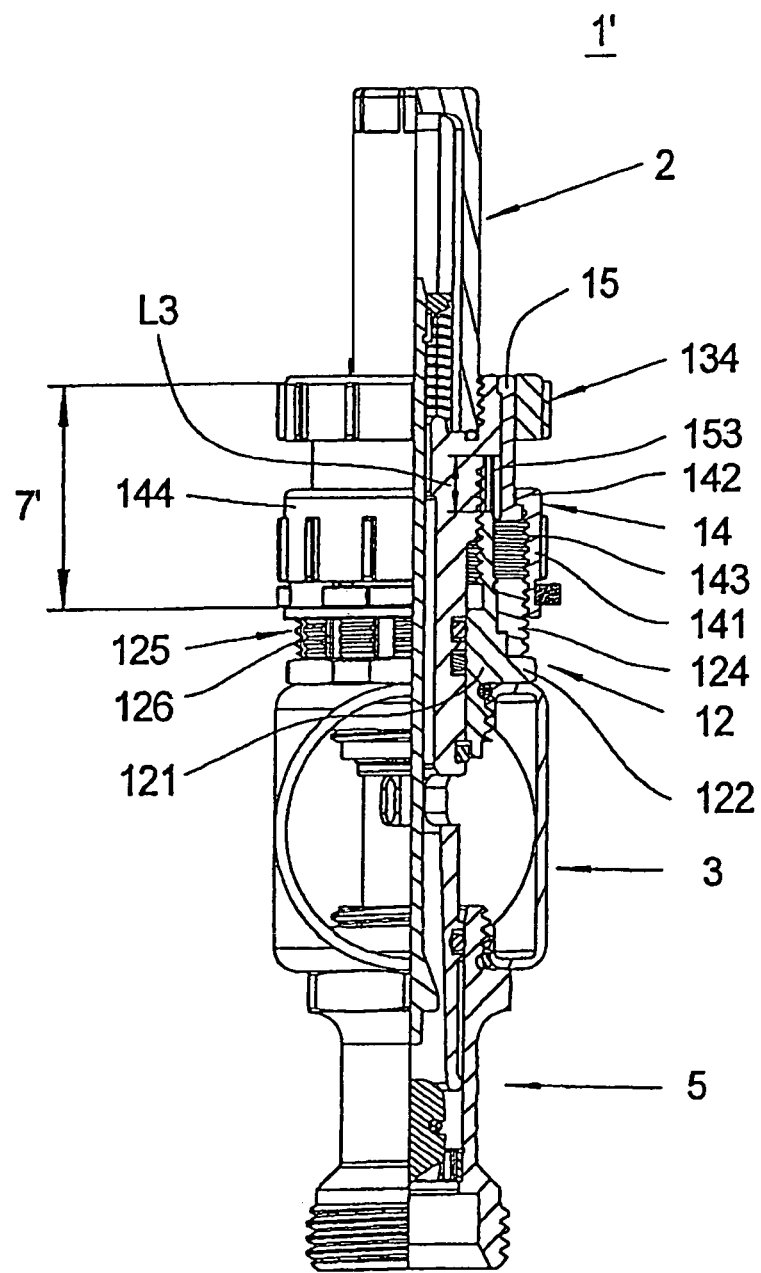

There is shown in:

FIG. 1 a new distribution valve according to the invention in a cross-sectional view, screwed in a line pipe, in a base position "closed";

FIG. 2 the new distribution valve according to FIG. 1 in a first actuating phase relative to the fixation of the presetting;

FIG. 3 the new distribution valve according to FIG. 1 in a second actuating phase;

FIG. 4 the new distribution valve according to FIG. 1 in a third actuating phase, finishing of the presetting, valve opened;

FIG. 5 the new distribution valve according to FIG. 1 with set presetting, valve closed;

FIGS. 6*a* and 6*b* details of the new distribution valve according to FIG. 1, with closed and opened valve;

FIG. 7 in a half sectional view a second variation of a distribution valve with the device for presetting, valve closed;

FIG. 8 the distribution valve according to FIG. 7, valve opened; and

FIGS. 9*a*, 9*b*, 9*c* a partial sectional view of a second embodiment variation of the blocking cap and security element represented in FIGS. 7 and 8.

The new distribution valve 1 with integrated through flow metering device of a first embodiment variation is schematically shown in FIG. 1 in a cross-sectional representation. The distribution valve 1 comprises an upper group 1*a* with an attachment element 4 belonging to the distribution valve 1 is fixed in an upper opening 31 in line pipe 3. A lower opening 32 is furnished disposed oppositely in the line pipe 3, wherein longitudinal axes are conceptually passing through these two openings 31, 32, wherein the longitudinal axes are not drawn for purposes of clarity and are aligned relative to each other. Device components of the lower group 1*b* of the distribution valve 1 are fixed at the lower opening 32 and in fact here a connection pipe 5 in a special embodiment. The valve body 6 of the valve 1 is longitudinally shiftable guided in the attachment element 4.

A stroke limiter 7 is coordinated to the distribution valve now in a new and inventive construction. This stroke limiter 7 is preferably integrated at the upper group 1*a* of the distribution valve 1. This stroke limiter 7 is disposed at an outside lying section 41 of the attachment element 4 and can variably be set according to a special construction according to the FIGS. 1 through 6*b*.

According to a preferred embodiment this stroke limiter 7 comprises a set member, an intermediate part 8 and a securing element, here the blocking member 9.

The intermediate part 8 is effective in connection with the blocking member 9, the valve body 6, and the attachment element 4 guiding the valve body 6. Reference is made in the following to FIGS. 2 through 6*b*, concerning the further technical details at the new distribution valve.

The intermediate part 8 is disposed concentric around the longitudinal axis of the distribution valve 1, here in a special construction with an inner thread bore hole furnished in the outer section 41 of the attachment element 4. For this purpose the cylinder body 81 of the intermediate part 8 is equipped with an outer thread 86. A through going inner thread 85 is in addition provided at the cylindrical body 81. This inner thread 85 engages at an outer thread 69 furnished in the upper region 61 of the valve body 6. A collar 83 furnished at the upper side 82 of the intermediate part is at least shape matchingly connected to the blocking member 9, wherein the blocking member 9 is axially shiftable relative to the intermediate part 8 without losing the shape matching property.

The blocking member 9 with its cylindrical body 91 is axially shiftable disposed concentric around the outer disposed section 41 of the attachment element. A recess 94 is furnished in the blocking member 9 outgoing from the lower front face 93. The region near the lower front face 93 is formed as a flange 95 in order to be able to hold the cylindrical body 91 by itself slim and thin walled. This flange 95 grips over the hexagon collar 42 of the attachment element 4 and the recess 94 grips shape matchingly over the hexagon collar 42 such that the blocking member 9 and therewith also the intermediate part 8 connected rotary secured to the blocking member is disengageably arrested in this position.

The line pipe 3 has—as seen in a cross-section—an upper opening 31 and a lower opening 32, which are both disposed aligned relative to a conceptually disposed axis running through the cross-section.

The attachment element 4 has a section 41 disposed outward relative to the line pipe 3, wherein the section 41 has an inner thread bore hole and with an axially body inwardly directed, radial disposed hexagon collar 42. The passage bore hole 44 is furnished in the attachment element 4 running from the one front side up to the other front side, wherein the passage bore hole 44 furnishes a guide for the valve body 6 recited further down below. In addition, an inwardly disposed section 43 is furnished at the attachment element 4, wherein the section 43 is provided with an outer thread. The attachment element 4 is fixed with this outer thread in the upper opening 31 of the line pipe 3. The attachment element 4 is turned in with this inwardly disposed section 43 until the hexagon collar 42 is resting solidly and impervious to liquids at the outer wall of the line pipe 3.

The connection pipe 5 belonging to the lower group 1b is fixed in the lower opening 32 of the line pipe 3. This connection pipe 5 has a cylinder body 51, wherein a threaded stem of the cylinder body 51 staggered with respect to the collar 52 is turned into the lower opening 32 until the collar rests solidly and impervious to liquids at the outer face of the line pipe 3. The connection pipe 5 has in addition a through passage bore hole 53 with an exit opening 54—pointing downwardly in the drawings—. The valve seat 55 of the distribution valve 1 is disposed in the through passage bore hole 53 in the region near to the exit opening 54. A seal 56, preferably an O-ring, is furnished on the valve seat 55, that is on the outer jacket face, and lying in part in a ring channel.

The through flow metering device comprises a casing 21 (in part transparent), of plunger 22 with flow-on member, a force storage 23 (spring) and a display part 24.

The valve body 6 of this distribution valve 1 is schematically subdivided into an upper region 61, into a middle region 62, and into a lower region 63 with the purpose of an illustrating presentation. The casing 21 of the through flow metering device 2 is disposed at or, respectively, in the upper front side 64. For this purpose a ground bore hole is furnished in the upper front side 64. The valve 6 has in addition a through passage bore hole 65, wherein the plunger 22 of the through flow metering device is disposed such that the on-flow member is connected with the plunger 22 and forming a single piece—in its base position—and is disposed in the middle region 62. The through passage hole 65 is section by section expanded with respect to diameter in the direction of the lower front side 68 and the through passage borehole 65 has the largest inner diameter by the amount at the bottom, at the lower front side 68. In addition, at least one through passage borehole 67 is furnished in the middle region 62, wherein the fluid fed into the line pipe flows through the through passage bore hole 67 of the valve seat and passes into the branch 11 while an open position is present.

The position of the set member of the stroke limiter formed here as an intermediate part 8 is shown in its base position in the FIGS. 6a and 6b. The blocking member 9 is shifted axial upwardly in the FIG. 6a and now shape matching connected with the intermediate part 8 and shape matching connected with the upper region 61 of the valve body 6. The intermediate part 8 lies still at the reference face 45 of the attachment element 4 with its lower front face. The position of the stop part 10 relative to the reference face 45 is here marked with the distance L1. The stop part 10 held in the intermediate part 8 migrates up to a position whose distance relative to the reference face 45 is marked with the distance L2, compare FIG. 6b, based on the rotary motion of the blocking member 9, whereby the valve body 6 is also synchronously axially moved. The difference between the distance L1 and the distance L2 is designated distance L3 in these two figures placed opposite to each other. This change in position, the distance L3, corresponds to a certain through flow volume. The set member, here the intermediate part 8, is fixed in its position and arrested after the shifting down of the blocking member 9, since the blocking member 9 is held secured against rotation at the attachment element 4 as already described above. The valve 46 is turned into the distribution valve 1 upon so far until the lower front side 68 or, respectively, internal cones furnished at the lower front side 68 rest at the valve seat 55 for closing of the distribution valve 1. The valve body 6 is moved outwardly in the opposite axial direction through a rotation motion until the outer thread 69 impacts at the stop part 10 for opening of the distribution valve 1, thus the preset position, which corresponds to a certain through flow volume, is set and adjusted. The closure and the opening can be repeated several times and each time during opening a reproduceable opening position can be produced. As needed a damping member can be disposed between the end region of the outer thread 69 and the stop part 10 in order to avoid damaging the outer turn of the outer thread 69.

A second embodiment variation of the new distribution valve with integrated through flow metering device is shown in FIGS. 7 and 8. A stroke limiter 7' is here employed, wherein the set member is made up of two parts and includes a blocking cap 14 and a stop sleeve 15. In addition, here the security element is formed by a securing ring 145, wherein the securing ring 145 is disposed on the outer jacket 144 of the blocking cap 14. The same device parts or, respectively, construction components with the same body sections as in the above described first embodiment example are designated with the same reference numerals. The attachment element furnished here with the reference character 12 is also furnished with an inner thread bore hole at it's outwardly disposed section 121, wherein the inner thread bore hole here also is performed as a ground bore hole. A collar 122 also still belongs to the outwardly disposed section 121, wherein the fastening element 12 solidly and impervious against liquid rests at the outer face of the line pipe 3. A thread ring 124 is plugged onto and arrested on the outer diameter of this outwardly disposed section 121 above this collar 122, preferably over about half the body length. The thread ring 124 exhibits an outer thread 125. Several longitudinal channels 126 are incorporated in this outer thread 125.

The valve body is designated with 13 in this embodiment example. The lower section 63 and the middle section 62 of the valve body 13 are constructed in the same way as the valve 6 of the above described first embodiment variation. The upper region of this valve body 13 carries here the reference character 131. An outer thread section 132 is furnished in this upper region 131, wherein the outer thread section 132 is axially directed outside of the body and is delimited by a stop collar 133. A stop sleeve 15, which is axially directed inward of the body, is plugged onto the outermost outer end section of the valve body 13, wherein the stop sleeve 15 is described still in detail and function further down.

The blocking cap 14 comprises a sleeve part 141, which sleeve part 141 exhibits an inner collar 142 on one end and an inner thread 143 inside up to the other front face. The outer jacket 144 is furnished with several grip parts. In addition, a ring channel is furnished in this outer jacket 144 in the region of the—in the drawing—lower end, wherein the securing ring 145 is rotatable supported in the ring channel. Passage holes not shown in the drawing grip in addition through the outer jacket, through the part regions of the securing ring 145 with a corresponding position of the securing ring 145 and engage into at least one longitudinal channel 126 and therewith arrest the blocking cap 14 against axial shifting by the creation of a rotation prevention security.

The stop sleeve 15 together with the blocking cap 14 forming the set member is furnished on one end with an inner flange 151 and on another end with an outer flange 152. The inner jacket face reaches on the one front side, which is the lower front side in the drawing, inward to the interior flange 151 and is furnished the longitudinal grooves 153. This stop sleeve 15 is shifted over the end side outer diameter of the valve body 13. Shape matching is generated by the knurling of this outer diameter of the valve body 13 and the inner lying longitudinal grooves 153 of the stop sleeve 15. The axially outward of the body directed front face of the stop sleeve 15 is essentially flush with the front face of the valve body 13. In addition, the end region of the outer diameter of the valve body 13 is formed such that the interior flange 151 rests at a correspondingly formed landing in the outer diameter of the valve body 13.

The previously identified features of the drawings show in fact several preferred embodiments, however also other embodiments according to the invention are considered as mentioned in the discussion. This disclosure offers illustrating embodiments according to the invention provided as examples and not as limitations. A person of skill in the art can conceive numerous other modifications and embodiments, which fall into the frame and spirit of the principles of the present invention.

A such possible modification of the invention is shown in the FIGS. 9a, 9b, and 9c. It is provided with the recited second embodiment variation according to the present invention that the security element for arresting the desired axial position of the blocking cap 14a is formed integral with the blocking cap 14a for further improvement of the handling of the set member for the stroke limitation. In the FIGS. 9a and 9c is only shown the further variation of a blocking cap with a securing element. Here the overall presentation of the new valve according to the present invention is dispensed with for purposes of clarity. The valve by itself is already presented in the FIGS. 7 and 8 and is explained in the associated parts of the description. The above recited and described securing ring 145 is here replaced by locking parts 147a, which locking parts 147a are furnished at the outer jacket 144a of the blocking cap 14a. Here the outer jacket 144a of the blocking cap 14a is formed itself as an axially shiftable ring part 144a. This ring part 144a is disposed concentrical around the sleeve part 141a of the blocking cap 14a. Here the ring part 144a is in its axial length shorter than the sleeve part 141a. Four spring elastic snap-in parts 147a are preferably furnished in the axially shiftable ring part 144a and are preferably arranged in a 90 degree subdivision. A same number of recesses 146a is furnished in the sleeve part 141a. In each case, a snap-in part 147a protrudes through recesses 146a into the inner chamber of the sleeve part 141a. Two function positions are settable by axial shifting of the ring part 144a guided at the sleeve part 141a. In the one position each snap-in part 147a protrudes, as precedingly recited, into the inner space of the sleeve part 141a—the arresting position—, in the other position—motion position—each snap-in part 147a is radially pressed outwardly by lying on a wall section of the recess 146a. Each snap-in part 147a in the arresting position grips into one of the already above recited longitudinal channels 126 (not shown here) of the attachment element 12 (not shown here). A blocking part 149a is disposed in the radial slot 148a formed between a front side of the ring part 144a and the sleeve part 141a for securing this position. The blocking part 149a is removed and the ring part 144a is shifted in axial direction for changing of the set position of the stroke limiter, that is to the assumption of the motion position, such that the snap-in parts 147a are led out of the longitudinal channels of the attachment element. Then the blocking cap 14a is brought into a new set position in axial direction by rotation. Then the ring part 144a is axially moved in an opposite direction, whereby the spring elastic snap-in parts 147a move again inwardly and finally in each case the into a longitudinal channel of the attachment element. A rotation of the blocking cap 14a with its inner thread 143a at the outer thread 125 of the thread ring 124 (not shown here, compare FIGS. 7 and 8) is now not possible. The blocking part 149a is again disposed in the radial slot 148a, whereby an unintentional opening of the blocking mechanism cannot occur.

The new distribution valve can be employed at distribution valves with an integrated through flow metering device of most different construction, independent of how the valve seat and/or the valve body are formed and dependent on their position.

LIST OF REFERENCE CHARACTERS 1, 1' distribution valve
    1a upper group of position 1
    1b lower group of position 1
2 through flow metering device
    21 casing (in part transparent)
    22 plunger and on-flow member
    23 force storage (spring)
    24 display part
3 line pipe
    31 upper opening in the line pipe
    32 lower opening in the line pipe
4 attachment element
    41 outwardly lying section with inner thread bore hole
    42 hexagon collar
    43 inwardly lying section with outer thread
    44 through passage bore hole (guide for position 6)
    45 reference face
5 connection pipe
    51 cylinder body
    52 collar with offset threaded stem
    53 through passage bore hole
    54 exit opening
    55 valve seat
    56 seal (O-ring on jacket face position 55, in ring channel)
6 valve body (tube shaped element)
    61 upper region of position 6
    62 middle region of position 6
    63 lower region of position 6
    64 upper front face
    65 through passage bore hole
    66 outer jacket face
    67 passage bore hole
    68 lower front face
    69 outer thread
7, 7' stroke limiter
8 intermediate part
    81 cylinder body
    82 upper side
    83 collar
    84 lower side
    85 inner thread 86 outer pipe
87 turned groove
9 blocking member
  91 cylindrical body
  92 upper front face
  93 lower front face
  94 recess (hexagon shaped)
  95 flange
  96 passage bore hole with longitudinal grooves
  97 middle bore hole
  98 front bore hole
10 stop part (for example snap ring) in position 8
11 branch (pipe)
12 attachment element
  121 outside disposed section with inner thread bore hole
  122 collar
  123 front face
  124 threaded ring
  125 outer thread
  126 longitudinal channels in position 124
13 valve body
  131 upper region of position 13
  132 outer thread section
  133 stop collar
  134 hand wheel
14 blocking cap
  141 sleeve part
  142 inner collar
  143 inner thread
  144 outer jacket with gripping parts
  145 securing ring
14a blocking cap (second variation)
  141a sleeve part
  142a inner collar
  143a inner thread
  144a outer jacket with gripping parts (axially shiftable ring part)
  146a recesses in position 141a
  147a snap-in parts
  148a radial slot
  149a blocking part
15 stop sleeve
  151 inner flange
  152 outer flange
  153 longitudinal grooves
L1 distance of position 10 relative to a reference face
L2 distance of position 10 inner second position relative to the same reference face
L3 difference between the distance L1 and the distance L2

The invention claimed is:

1. A distribution valve (1) integrated through flow metering device (2), in particular for hot water heating plants, for use at a line pipe (3), wherein a closable valve seat (55) and thereto an axially movable closure part (6) are furnished in the distribution valve, wherein one section of the closure part (6) is held and guided in an attachment element (4), which attachment element (4) is disposed on an outside at an opening (31) in the line pipe (3) and wherein said section of the closure part has a gripping element,
  wherein
    a stroke limiter (7; 7') is coordinated to the closure part (6) or the guiding attachment element (4), wherein the stroke limiter (7; 7') limits an axial shifting of the closure part (6) associated with the opening distribution valve (1),
  wherein
    the stroke limiter (7; 7') is formed by an axially movable set member (8; 14, 15), and by a securing element (9; 145);
  wherein the set member is an intermediate part (8), wherein the intermediate part (8) is disposed concentrically to the motion axis of the valve (1) between a section of the attachment element (4) and a section of the closure part (6);
  wherein
    the intermediate part (8) is a cylinder body (81), wherein an upper side (82) of the cylinder body (81) exhibits a collar (83), and wherein a through running inner thread (85) directed body inwardly is furnished from a lower side (84) of the collar (83) and wherein an outer thread (86) direct that body inwardly is furnished, wherein a turned groove (87) is disposed on the upper side (82) in a direction inner thread (85), wherein a stop part (10) is disposed in the turned groove (87).

2. The distribution valve according to claim 1,
  wherein
    the securing element is a blocking member (9), wherein the blocking member (9) with its cylindrical body (91) is axially shiftable and concentric disposed around the outwardly lying section (41) of the attachment element (4) and the blocking member (9) is shape matchingly connected with the intermediate part (8) of each of its possible axial positions.

3. A distribution valve (1) with integrated through flow metering device (2), in particular for hot water heating plants, for use at a line pipe (3), wherein a closable valve seat (55) and thereto an axially movable closure part (6) are furnished in the distribution valve, wherein one section of the closure part (6) is held and guided in an attachment element (4), which attachment element (4) is disposed on an outside at an opening (31) in the line pipe (3) and wherein said section of the closure part has a gripping element,
  wherein
    a stroke limiter (7; 7') is coordinated to the closure part (6) or the guiding attachment element (4), wherein the stroke limiter (7; 7') limits an axial shifting of the closure part (6) associated with the opening of the distribution valve (1),
  wherein
    the stroke limiter (7; 7') is formed by an axially movable set member (8; 14, 15), and by a securing element (9; 145);
  wherein
    the securing element is a blocking member (9), wherein the blocking member (9) with its cylindrical body (91) is axially shiftable and concentric disposed around the outwardly lying section (41) of the attachment element (4) and the blocking member (9) is shape matchingly connected with the intermediate part (8) of each of its possible axial positions;
  wherein the cylindrical body (91) of the blocking member (9) starting from its upper front face (92) and in the direction of the lower front face (93) exhibits a through passage bore hole (96) with longitudinal grooves, a middle bore hole (97) and a front bore hole (98), wherein a body region near the lower front face (93) is formed as a flange (95) and wherein, starting with the lower front face (93), a hexagon shaped recess (94) is furnished.

4. The distribution valve according to claim 1, wherein the set member is formed by a blocking cap (14) and a stop sleeve (15).

5. A distribution valve (1) with integrated through flow metering device (2), in particular for hot water heating plants, for use at a line pipe (3), wherein a closable valve seat (55) and thereto an axially movable closure part (6) are furnished in the distribution valve, wherein one section of the closure part (6) is held and guided in an attachment element (4), which attachment element (4) is disposed on an outside at an opening (31) in the line pipe (3) and wherein said section of the closure part has a gripping element, wherein
a stroke limiter (7; 7') is coordinated to the closure part (6) or the guiding attachment element (4), wherein the stroke limiter (7; 7') limits an axial shifting of the closure part (6) associated with the opening of the distribution valve (1),
wherein
the stroke limiter (7; 7') is formed by an axially movable set member (8; 14, 15), and by a securing element (9; 145);
wherein the set member is formed by a blocking cap (14) and a stop sleeve (15);
wherein
the stop sleeve (15) with its inner flange (151) on a top engages the closure part and wherein an outer flange (152) furnished at the other end cooperates with an inner collar (142) of the blocking cap (14).

6. A distribution valve (1) with integrated through flow metering device (2), in particular for hot water heating plants, for use at a line pipe (3), wherein a closable valve seat (55) and thereto an axially movable closure part (6) are furnished in the distribution valve, wherein one section of the closure part (6) is held and guided in a fastening element (12), which fastening element (12) is disposed on an outside at an opening (31) in the line pipe (3) and wherein said section of the closure part has a gripping element, wherein
a stroke limiter (7; 7') is coordinated to the closure part (6) or the guiding fastening element (12), wherein the stroke limiter (7; 7') limits an axial shifting of the closure part (6) associated with the opening of the distribution valve (1),
wherein the stroke limiter (7; 7') is formed by an axially movable set member (8; 14, 15), and by a securing element (9; 145);
wherein the set member is formed by a blocking cap (14) and a stop sleeve (15);
wherein
the blocking cap (14) exhibits an inner thread (143), with which the blocking cap (14) is disposed rotatably at an outer thread (125) of a fastening element (12).

7. A distribution valve (1) with integrated through flow metering device (2), in particular for hot water heating plants, for use at a line pipe (3), wherein a closable valve seat (55) and thereto an axially movable closure part (6) are furnished in the distribution valve, wherein one section of the closure part (6) is held and guided in an attachment element (4), which attachment element (4) is disposed on the outside at an opening (31) in the line pipe (3) and wherein said section of the closure part has a gripping element, wherein
a stroke limiter (7; 7') is coordinated to the closure part (6) or the guiding attachment element (4), wherein the stroke limiter (7; 7') limits the axial shifting of the closure part (6) associated with the opening of the distribution valve (1),
wherein
the stroke limiter (7; 7') is formed by an axially movable set member (8; 14, 15), and by a securing element (9; 145);
wherein the set member is formed by a blocking cap (14) and a stop sleeve (15);
wherein the securing element is a securing ring (145), wherein the securing ring (145) is disposed disengageably and arrestably in the outer jacket (144) of the blocking cap (14).

8. A distribution valve (1) with integrated through flow metering device (2), in particular for hot water heating plants, for use at a line pipe (3), wherein a closable valve seat (55) and thereto an axially movable closure part (6) are furnished in the distribution valve, wherein one section of the closure part (6) is held and guided in an attachment element (4), which attachment element (4) is disposed on an outside at an opening (31) in the line pipe (3) and wherein said section of the closure part has a gripping element, wherein
a stroke limiter (7; 7') is coordinated to the closure part (6) or the guiding attachment element (4), wherein the stroke limiter (7; 7') limits an axial shifting of the closure part (6) associated with the opening the distribution valve (1),
wherein the stroke limiter (7; 7') is formed by an axially movable set member (8; 4, 15), and by a securing element (9; 145);
wherein the set member is formed by a blocking cap (14) and a stop sleeve (15);
wherein the securing element is arranged integral with the blocking cap (14).

9. The distribution valve according to claim 8, wherein
the blocking cap (14*a*) is formed in two parts, wherein the blocking cap (14*a*) comprises an inner sleeve part (141*a*) and a ring part (144*a*) concentrically and shiftably disposed at the inner sleeve part (141*a*), wherein the securing element is at least a spring-elastic snap-in part (147*a*), which spring-elastic snap-in part (147*a*) belongs to the ring part (144*a*), wherein the spring-elastic snap-in part (147*a*) inwardly grips through the inner sleeve part (141*a*) in a recess (146*a*).

\* \* \* \* \*